United States Patent
Gottschlag et al.

(10) Patent No.: US 12,547,456 B2
(45) Date of Patent: Feb. 10, 2026

(54) FLEXIBLE LIMITERS FOR MANAGING RESOURCE DISTRIBUTION

(71) Applicant: SAP SE, Walldorf (DE)

(72) Inventors: Mathias Gottschlag, Altrip (DE); Tobias Scheuer, Bruchsal (DE)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 18/338,623

(22) Filed: Jun. 21, 2023

(65) Prior Publication Data
US 2024/0427630 A1    Dec. 26, 2024

(51) Int. Cl.
G06F 9/48 (2006.01)
G06F 9/50 (2006.01)
G06F 11/14 (2006.01)
G06F 11/1446 (2026.01)

(52) U.S. Cl.
CPC ............. G06F 9/4881 (2013.01); G06F 9/50 (2013.01); G06F 9/5005 (2013.01); G06F 11/1448 (2013.01); *G06F 2209/485* (2013.01); *G06F 2209/5018* (2013.01); *G06F 2209/504* (2013.01)

(58) Field of Classification Search
CPC ..... G06F 9/4881–5005; G06F 11/1448; G06F 2209/485; G06F 2209/5018; G06F 2209/504
See application file for complete search history.

(56) References Cited

U.S. PATENT DOCUMENTS

| | | | | |
|---|---|---|---|---|
| 11,449,502 | B1 * | 9/2022 | Richards | G06F 16/2453 |
| 2010/0229218 | A1 * | 9/2010 | Kumbalimutt | G06F 9/5005 726/4 |
| 2010/0262975 | A1 * | 10/2010 | Reysa | G06F 9/5077 718/105 |
| 2014/0173616 | A1 * | 6/2014 | Bird | G06F 9/5083 718/104 |
| 2015/0113540 | A1 * | 4/2015 | Rabinovici | G06F 9/5011 718/104 |
| 2019/0384843 | A1 * | 12/2019 | White | G06F 16/9024 |
| 2021/0004712 | A1 * | 1/2021 | Sarferaz | H04L 41/16 |
| 2021/0096920 | A1 * | 4/2021 | Troester | G06F 9/5022 |
| 2022/0229699 | A1 * | 7/2022 | Gatti | G06F 9/3009 |

OTHER PUBLICATIONS

From the Application to the CPU: Holistic Resource Management for Modern Database Management Systems Stefan Noll, Norman May, Alexander Bohm, Jan Muhlig, Jens Teubner (Year: 2019).*

* cited by examiner

*Primary Examiner* — April Y Blair
*Assistant Examiner* — Paul V Mills
(74) *Attorney, Agent, or Firm* — Fish & Richardson P.C.

(57) ABSTRACT

The present disclosure relates to computer-implemented methods, software, and systems for flexibly managing limits for execution of jobs in parallel threads provided by a system. A request for the execution of a first statement at one or more threads associated with parallel processing at the system is received. A first snapshot object of an initial hierarchy of workload classes is obtained. The first snapshot object includes pointers to limiters defined for the workload classes and statements within the initial hierarchy. Each limiter defines an allowable number of threads for parallel execution of jobs. A modification to the hierarchy of workload classes is performed during runtime of the one or more jobs. A second snapshot object of a modified hierarchy of the workload classes. The execution of one or more created jobs is completed based on complying with limits as aggregately calculated for the first statement.

20 Claims, 6 Drawing Sheets

FLEXIBLE LIMITERS FOR MANAGING RESOURCE DISTRIBUTION

TECHNICAL FIELD

The present disclosure relates to computer-implemented methods, software, and systems for data processing.

BACKGROUND

Software complexity is increasing and causing changes to lifecycle management and maintenance of software applications, databases, and platform systems. The volume of data generated by various applications and services has also grown rapidly. Processing and storing of data can be associated with a large amount of computer resources such as computing, storage, and network resources. Executing data queries over large data volumes can be a cumbersome task that can involve various considerations including prioritization, resource limitations, account configurations, or maintenance, among other examples.

SUMMARY

Implementations of the present disclosure are generally directed to a computer-implemented method for allowing dynamic modifications of resource allocation during job execution by flexibly modifying limiters associated with a hierarchical structure of workload classes for execution in multiple threads in a system.

One example method may include operations such as in response to receiving a request for the execution of a first statement at one or more threads associated with parallel processing at the system, obtaining a first snapshot object of an initial hierarchy of workload classes organizing sets of statements, wherein the first snapshot object includes pointers to limiters defined for the workload classes and the statements within the initial hierarchy, wherein each limiter defines an allowable number of threads for parallel execution of jobs created for a statement or a workload class, and wherein each of the limiters is applied to a respective workload class and one or more child workload classes or statements in aggregation; performing a modification to the hierarchy of workload classes during runtime of the one or more jobs; obtaining a second snapshot object of a modified hierarchy of the workload classes; and completing the execution of one or more created jobs for the execution of the first statement based on complying with limits as aggregately calculated for the first statement according to application of the limiters defined for the initial hierarchy of workload classes.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors and a computer-readable storage medium coupled to the one or more processors, having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and the claims.

DETAILED DESCRIPTION

Figure 1:
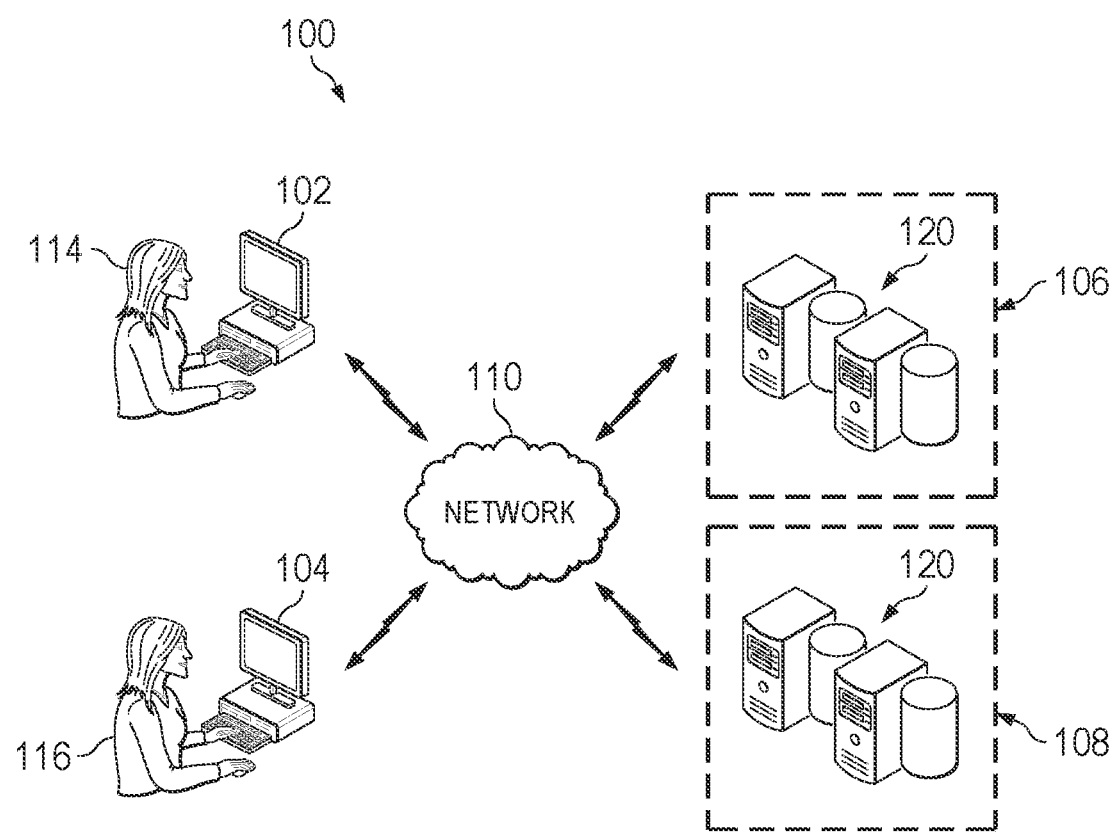
FIG. 1 is a block diagram depicting an example computer-implemented system that can execute implementations of the present disclosure.

The present disclosure describes various tools and techniques for controlling the execution of tasks in a database management system.

In some instances, a database management system can be configured to run and execute queries or other statements based on provided available computing resources. In some cases, to maximize the overall performance of the system, the demand for resources can be balanced between various workload classes. Workload classes or units of operation can be defined as a class of requests, statements, operations. In some instances, the class of requests, statements, or operations can be a class that is associated with a single user, a single application (e.g., "user X is allowed to consume 25% of the available CPU"), or other common characteristic or type of the requests, statements, or operations. For example, a workload class can contain transactional queries, analytical queries, or other statements, from a user or a specific application. For example, a workload class can be a transactional query, an analytical query or other statement that can be executed on a database management system or other application. The execution of workload classes can be managed to provide balance and fine tuning of the control of execution and utilization of resources provided by the underlying system or application.

When a workload class is executed, the execution involves execution of statements that can be limited in their execution based on the underlying computing resources, such as memory, CPU and threads, and/or network bandwidth, among other limitations. Workload classes can be defined in a hierarchy of units of operation that can be defined to limit the resource consumption of a statement level. The organization of workload classes in such a logical hierarchical structure of execution and limitation can be provided to correspond to a prioritization of execution of statements and scheduling of jobs that can run on threads in a parallel manner. In this way, workload classes can be nested so that each statement can be executed without exceeding the limits in its workload class hierarchy.

In some instances, a large number of parallel jobs for a given statement or workload class can be requested for execution. To manage the execution of statements per workload, a limiter (or a limiter object) can be defined per statement or workload together with a counter used to count the resource usage of a particular workload class or statement. For example, the count for the resource usage can be defined as a number of jobs that have been placed in a queue of jobs and are currently executed by a thread in the memory. A statement can be defined as a leaf node in such a hierarchy structure and can have a statement limiter, where the statement can hold a queue of jobs that have not yet been admitted for execution by the system. These queued jobs are jobs that are not yet provided for execution, since their execution can violate the limits that are defined. The jobs in the queue associated with a statement can be consecutively provided for execution as soon as resources are made available (e.g., when a previously executing job has completed its execution) and the execution of the new job would not violate the limits as defined by the hierarchical structure of workload classes and included statements.

In some instances, if changes to the organization of the nesting of workload classes are made, such changes can influence the limits that are applicable to a statement at a given point in time. However, the fact that the hierarchy of workload classes can be modifiable at runtime can be associated with various issues of synchronization of allocation and deallocation of resources. For example, the modification of the hierarchy may require extensive synchronization to create new jobs that can result from the modification and the change of resource counters that can be maintained for the number of jobs that are executed per workload class in the hierarchy. Also, modification of counters and allocation and deallocation of resources can be associated with excessive resource usage for data processing and performing computational steps that are error prone and overload the system unnecessary.

In accordance with the present disclosure, a solution to such a synchronization problem can be provided by maintaining snapshots of the structure of workload classes and their nesting in a hierarchical manner together with limiters applied to the different workload classes and statements. For example, the management of the state of the hierarchy and the modification to the hierarchy can be performed as described in relation to FIGS. 2A, 3, and 4.

In some instances, execution of statements, queries, or other operations can be associated with a user from a particular account (e.g., account A). In some cases, limits can be applied on account level and on user level and can be associated with the use of different types of resources including memory, network bandwidth, or else. In some cases, the number of parallelly executed statements, queries, or operations, among other types of tasks, can be tracked and monitored to perform checks to determine whether newly received tasks are allowed to be executed without violating defined limitations. In cases where network bandwidth is the limited resource for executing tasks, counters can be defined per node in a hierarchical structure of statements to count the transmitted data within a time period. The counters can be associated with the limits defined per node of the structure. The limits would be defined to limit the amount of data per time period. For example, a workload class could only be allowed to consume 8 Gbps of a 10 Gbps connection (i.e., a limit could be configured to enforce a maximum of 100 MB per 10th of a second), and that workload class could be subdivided into two other workload classes allowed to transmit 5 Gbps each. In some instances, when data is not allowed to be sent for execution due to violation of limits (when considering the counters), the data can be queued (e.g., in a substantially similar way of queueing jobs defined for executing statements as discussed throughout the present disclosure.

For example, account A can be configured to be allowed to use up to a certain amount of the memory (e.g., 10 GB RAM). In some cases, there can be two users who are each allowed to use only 7 GB of RAM. In those cases, each statement by those users may be allowed to use no more than 1 GB of RAM. In such a scenario, when a statement is allocated with some memory, a counter associated with the set of statement, user, and account (e.g., based on a defined hierarchy for distribution of memory according to an initial configuration) can be increased and potentially checked (e.g., in a substantially similar way to the way that a new task (or job) can be add to as a counter for the parallelly executed tasks in a limiter). A statement can be checked based on defined limits for the number of parallel processes allowed for execution (e.g., for the statement, user, account or else), and if the check determines that allocation of more memory is not allowed (e.g., allocation fails), the statement can be put in a waiting mode until more memory is made available, or an error or another notification can be provided. In some cases, the statement execution can be aborted and can await a subsequent execution where the allocation of memory would be successful.

FIG. 1 is a block diagram depicting an example computer-implemented system 100 that can execute implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environment 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting an analytical tool in accordance with the present disclosure.

In some instances, the environments 106 or 108 can host applications and/or databases that can support the execution of tasks in a concurrent manner by controlling the execution over parallel threads in accordance with the present disclosure. In some instances, the environments 106 or 108 can host a database management system or an application that is defined to include workload classes that are defined as including a set of statements in a hierarchical manner. For example, the workflow of a system or an application can be defined according to a hierarchical structure of workload classes associated with the execution of distinct but related units of logic that can be provided with different computing resources for execution. The execution of tasks or jobs associated with the different workload classes can be performed according to limits defined for each node of the hierarchy and jobs can be controlled for parallel execution over threads. In some instances, snapshots of the state of the system at various stages can be performed to support dynamic modifications to the organization of work of workload classes without impacting the performance and proper allocation of resources for execution of statements that are running during such runtime modifications.

Figure 2A:
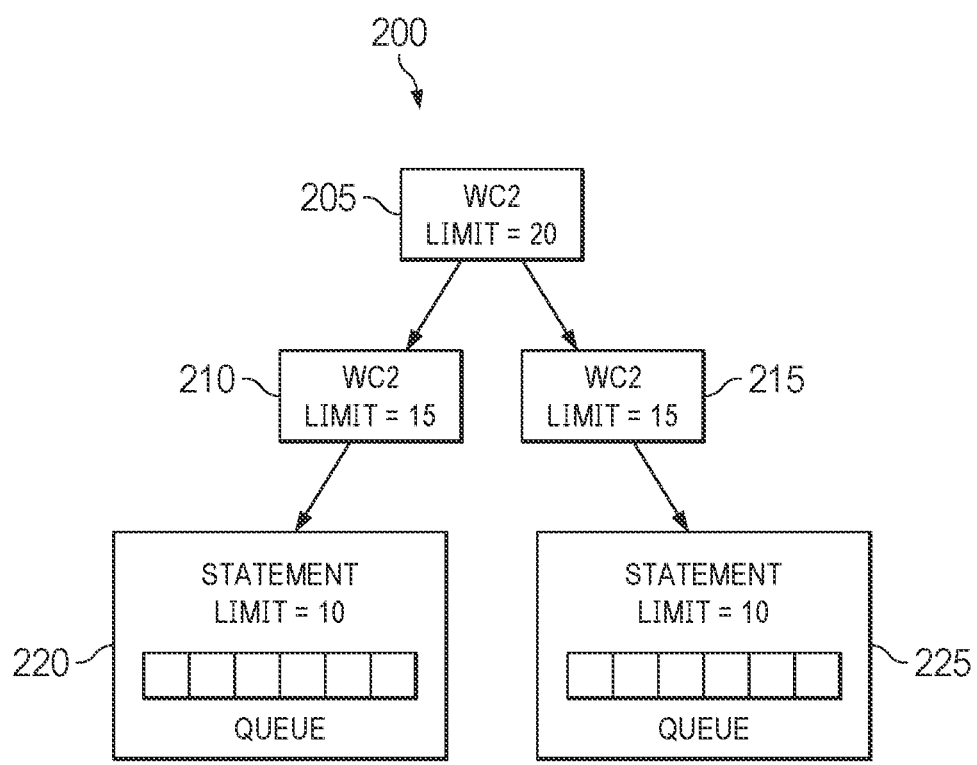
FIG. 2A is a block diagram of an example definition of workload classes in a hierarchical structure defining inherent limitations to parallel processing of jobs associated with a node of the hierarchy.

FIG. 2A is a block diagram of an example definition 200 of workload classes in a hierarchical structure defining inherent limitations to parallel processing of jobs associated with a node of the hierarchy. As shown, workload classes are nested one into another to define a structure of units that are each associated with a limiter defining a maximum allowable number of threads allocated to the respective workload class. The definition of limiters in such a tree structure can be evaluated during execution and limits for parent workload classes can be considered as aggregate limits for the child workload classes or statements (as nested). For example, for a statement to be executed, the limiters defined for the statement as well as for a chain of one or more workload classes within a path from the statement to the root workload has to be fulfilled, for one or more jobs of the statements to be pushed for execution at threads in parallel.

In more detail, the hierarchy defines a tree structure of workload classes that end with statements as leaf nodes. A workload class 205 is defined to include a set of statement and can be associated with a limiter that limits the threads that are allowable to be concurrently executed to be twenty (20). The limiter is associated with allowable parallel execution of jobs created for statements associated with that workload class 205. The workload class 205 has two nested workload classes, where those two workload classes each have a limit of fifteen threads. When determining how many threads may be allocated to the execution of jobs associated with a statement from the branch of workload class 210, that number should consider both the limits that are applicable to the parent workload class 205 and how many threads are already occupied for jobs associated with workload class 215. If workload class 215 has occupied 15 threads as the limit for that node, then at that point in time, the allowable number of threads for running jobs for workload class 210 would be only five (5) even if the limiter shows 15. To manage the allocation of execution and the distribution of load during runtime, each node in the workload structure definition 200 can be maintained together with a counter that is incrementally increased when a new thread is occupied with the execution of a job associated with a statement related to that particular workload (and/or other workloads due to inheritance). For example, if a statement 220 is requested to be executed, and five jobs are created and queued for that statement and await execution, when those jobs are started, a counter for the statement 220 can be changed to increase to the number of five, and the counter of the directly preceding nodes would also be increased as those aggregate the limits from child nodes. On the other head, if a counter for statement 220 is changed, a counter for a statement 225 would not need to be changed unless a job is created and started for execution for the statement 225.

Figure 2B:
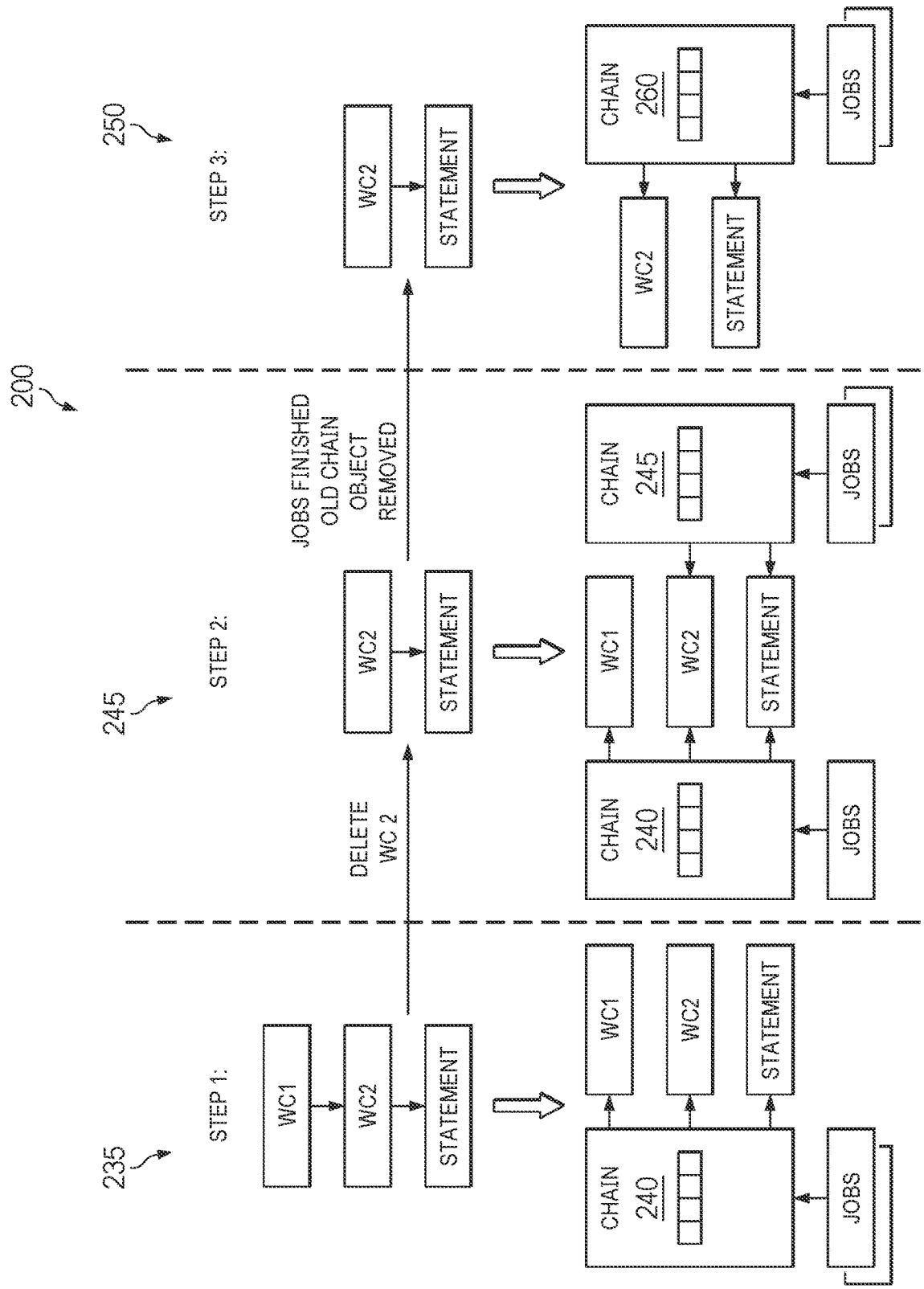
FIG. 2B is a block diagram of an example process for obtaining snapshots including pointers to a current hierarchical structure of workload classes, where jobs created for executing a statement of a workload class point to the snapshot during execution of the job to control the distribution of jobs over threads in parallel in accordance with implementations of the present disclosure.

FIG. 2B is a block diagram of an example process 230 for obtaining snapshots including pointers to a current hierarchical structure of workload classes, where jobs created for executing a statement of a workload class point to the snapshot during execution of the job to control the distribution of jobs over threads in parallel in accordance with implementations of the present disclosure.

For example, a hierarchical structure of workload classes is defined at step 235. The hierarchy defines two workload classes that are nested, where the second workload class is associated with a single statement. When a request is received for executing the statement, a set of jobs (one or more) can be created and a snapshot object can be created for the current state of the hierarchy as defined at step 235. The snapshot object can be defined as a chain object 240 that includes pointers to the elements of the hierarchical structure of 235, namely, the two workload classes and the statement.

At step 245, a modification to the structure is defined. In the present example, one of the workload classes is deleted. For example, such deletion can be a result of a modification of the processing of the structure in general or allocation of some workload classes to another structure, for example associated with a different pool of resources. If such a modification as in step 245 is performed simultaneously with a job created for the statement of the hierarchy 235, the modification can create confusion when determining the counters and the availability for execution of jobs as defined at the queue associated with the statement and their concurrent or subsequent execution at threads that should comply with the limits (e.g., as defined in FIG. 2A). To address the change of the hierarchy but also to maintain proper execution and allocation of resources, the execution of jobs for an already running statement can be performed in accordance with limits as calculated according to the initial snapshot (chain object) 240, while subsequently requested executions for a statement can be executed in accordance with a new state of the hierarchy. Thus, a new snapshot is taken, that is a chain object 245 which refers to the objects from the hierarchy that are part of the modified structure as defined at step 245. The two snapshots 240 and 245 would be relevant together as long as there are jobs that are still running and/or about to be run which are associated with a statement as defined before the hierarchy was modified.

Thus, once jobs, such as the jobs defined for the statement as the leaf from the hierarchy defined at step 235 are finished with their execution (execution is completed), at step 250, the initial snapshot object 240 can be discarded and the only snapshot object that would be maintained would be the chain object 245 that is a snapshot of the current hierarchy of workload classes as defined at step 245. Any request to execute a statement, for example, a new request to execute the leaf statement from the modified hierarchy, would be processed according to the determination of limits applicable and inherited based on the modified hierarchy.

Figure 3:
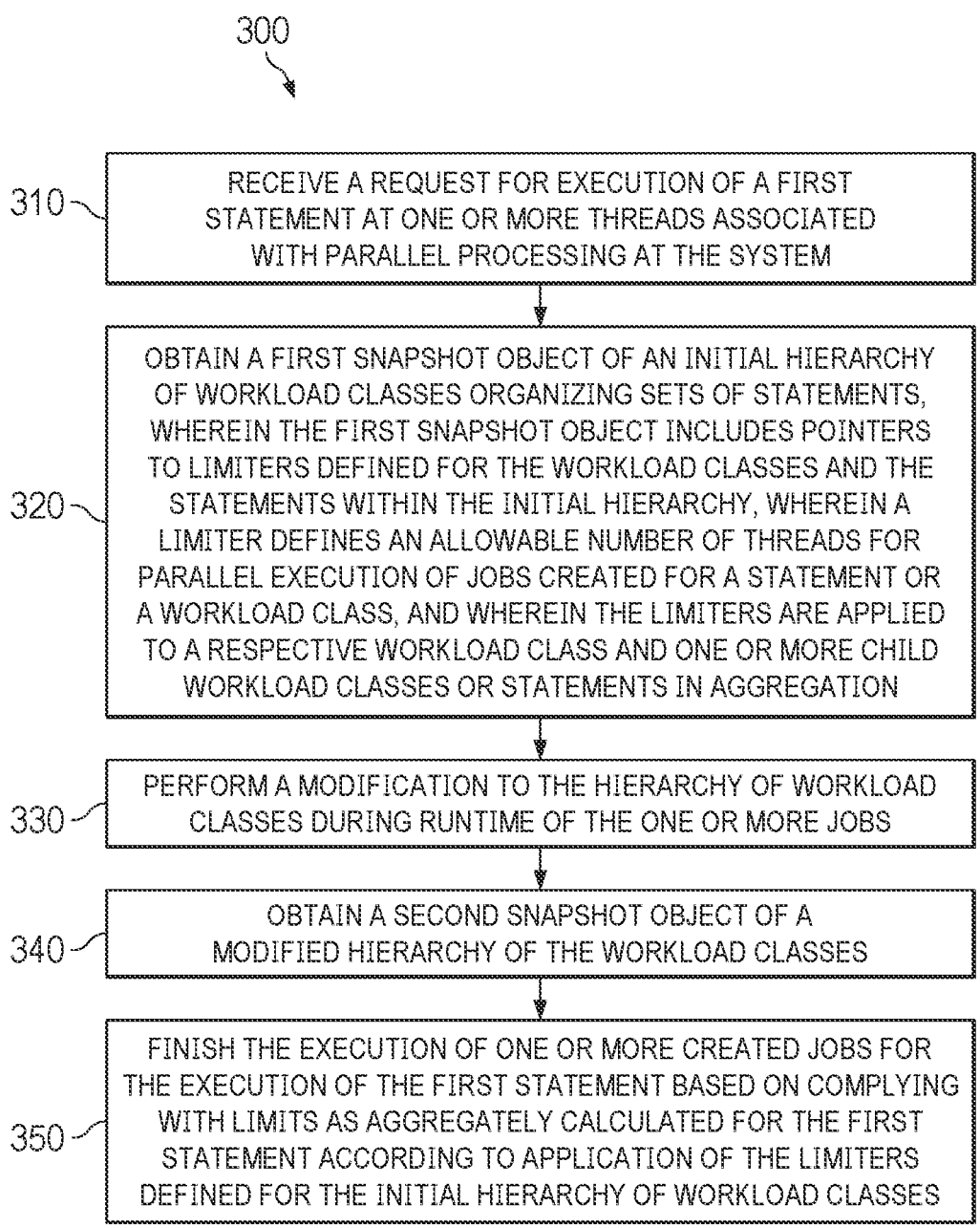
FIG. 3 is a flow diagram of a method for controlling the execution of concurrent threads executing jobs when a modification to the distribution of available resources is dynamically made in accordance with implementations of the present disclosure.

FIG. 3 is a flow diagram of a method 300 for controlling the execution of concurrent threads executing jobs when a modification to the distribution of available resources is dynamically made in accordance with implementations of the present disclosure. The method 300 can be executed in the context of a database management system or in the context of an application where resources are allocated to different units such as workload classes that include respective sets of statements related to the execution of a particular service. For example, a workload class can be related to a service for scanning data in a database and determining entries associated with a particular identifier. Such scanning of a table can be defined as a statement associated with a workload class and can be executed as part of an execution of a system or an application.

The method 300 can be applied to managing the execution of tasks as in the context of FIG. 2B. Further, the method 300 can be executed in the context of a system environment where the control of task execution is managed by multiple users requesting statement execution where a modification to the limitations of the system and the allocation of resources is made in accordance with implementations of the present disclosure.

A hierarchy of workload classes can be defined, for example, as a tree structure where nodes are defined as workload classes and leaves are statements. A workload class can include a set of statements, where limiters can be assigned to workload classes and to limiters and can be applied in aggregation by propagating the limits downwards through the hierarchical structure.

At 310, a request for the execution of a first statement at one or more threads associated with parallel processing at the system is received. In some instances, the execution of the first statement is related to an execution of a statement in the context of a system or an application execution and for example, based on a user or system request. In some instances, the first statement can be a statement such as the statement 220 or 225 of FIG. 2A. The statement can be associated with an initial hierarchy of workload classes, where limiters are defined for each of the workload classes and the statement as described in relation to FIG. 2A. The limiters are applied when a request for execution is received and a determination is made whether a job can be executed or whether the job needs to wait until it can resume its execution in order not to violate defined limits for the workload classes in the structure that supports the load balancing of the resource usage.

At 320, in response to the received request, a first snapshot object of an initial hierarchy of workload classes is obtained. The first snapshot object includes pointers to limiters defined for the workload classes and the statements within the initial hierarchy. A limiter associated with a statement (similar to the description for statement 220 or 225 of FIG. 2A) defines an allowable number of threads for parallel execution of jobs created for the statement. The limiters that are defined for the parent workload class of a statement apply cumulatively to the child statement of that parent class. The limiters for a workload class are defined in a similar manner.

In some instances, the limiters can be applied to a respective workload class and one or more child workload classes or statements in aggregation. For example, if a parent workload class defines a limit of maximum of twenty (20) threads for parallel processing for associated statements with the workload class, if two statements are defined as children to the parent workload class and those statements are each defined with a limit of maximum fifteen (15) threads in parallel processing, then if one of the statements starts execution and occupies the maximum fifteen (15) threads, the other statement would be allowed to use only five (5) as the difference between the maximum of the parent and the other sibling statements below the parent.

At 330, a modification to the hierarchy of workload classes is performed. For example, the modification is a change in the inheritance between at least two workload classes, a removal of a workload class.

At 340, once a modification to the hierarchy is performed, a second snapshot object of a modified hierarchy of the workload classes is obtained. Such a second snapshot object can be defined to be relevant for the execution of jobs after the modification. The execution of jobs prior to the modification can be performed in accordance with the initial hierarchy.

In some instances, based on the received request at 310, one or more jobs can be created for execution of the first statement and are stored in a queue associated with the first statement. The jobs can be maintained in the queue and invoked for execution at threads when based on a scheduling mechanism that can invoke new jobs for execution at threads when limiters are not violated and the number of current threads associated with a given statement complies with the limits for the statement as well as any aggregate limits that can apply from parent workload classes and when considering the number of other active threads executed by sibling workload classes. Each one of the one or more jobs includes a pointer to the first snapshot object. Thus, when a job is determined at the top of a queue, the job includes a reference to the hierarchical organization of the workload classes and a limit applicable for the job execution can be accurately calculated and used to determine when to trigger the job without violating the limits defined for the hierarchical structure of the system. Such organization of workload classes in a tree structure can be defined to match a required distribution and allocation of resources for different types of tasks, operations or services provided by a system or an application. In some instances, the definition of limiter and the hierarchical structure may also be used in the context of distributing the resources of a system accessible by multiple users that share access to resources. In this example, a workload class can be a set of statements that are available for a user, where the user can be associated with a limit of maximum allowable threads to run in parallel. In some instances, the limits of a user can be applied with consideration of available limits for an account to which the user belongs that also has assigned limiters. For example, the account allows a maximum of 20 threads to run in parallel when executing jobs for users associated with the account, where each user may be associated with 10 threads as a limit. In such cases, the determination of whether a user is allowed to execute an additional job is not determined just based on the limit associated with the user but also based on the current status of running threads associated with user of the account.

At 350, the execution of one or more jobs created for the execution of the first statement is finished. The execution of the one or more jobs can be performed based on complying with limits as aggregately calculated for the first statement according to application of the limiters defined for the initial hierarchy of workload classes.

In some instances, the first snapshot object can be deleted in response to finishing the execution of the one or more created jobs for the first statement at the system.

In some instances, in response to receiving a request for an execution of a second statement as part of a first workload class of the modified hierarchy, one or more jobs for the second statement can be created to be executed at one or more threads from the threads. The one or more jobs for the second statement can be executed based on the limits as aggregately calculated according to the modified hierarchy. The limiters defined for the workload classes and the statements in the modified hierarchy can be aggregately applied to propagate the limitations of a parent workload class to a child workload class or a statement.

Figure 4:
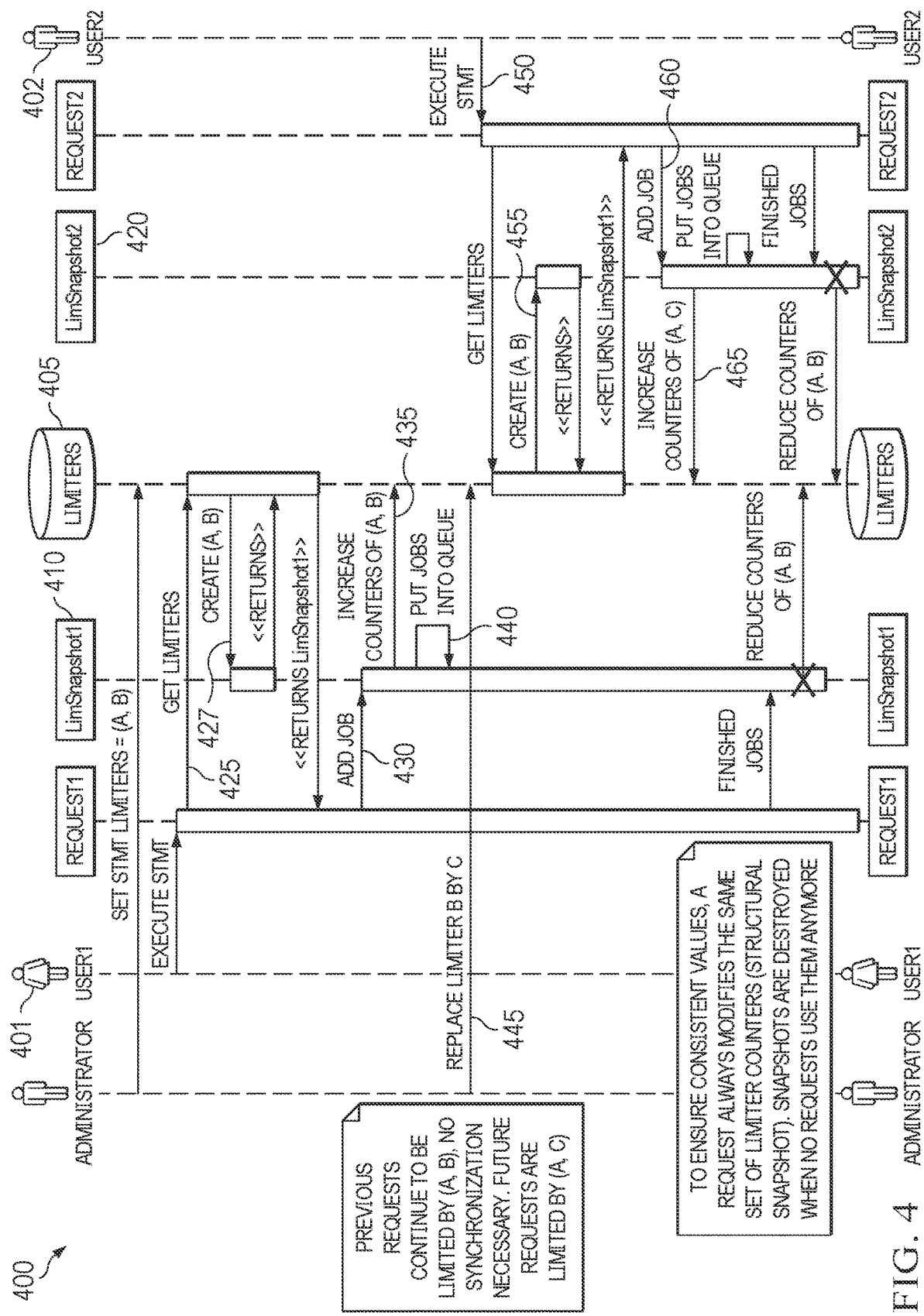
FIG. 4 is a sequence diagram of a database system environment where requests for the execution of statements from two users are handled based on storing snapshots of relevant states of the hierarchy of workload classes in accordance with implementations of the present disclosure.

FIG. 4 is a sequence diagram of a database system environment where requests for the execution of statements from two users are handled based on storing snapshots of relevant states of the hierarchy of workload classes in accordance with implementations of the present disclosure.

In some instances, the database system environment 400 includes a pool of threads for parallel execution of tasks that can be substantially similar to the pool 200 of FIG. 2A, and the pool 250 of FIG. 2B. In some instances, the pool of threads 405 is set up for execution of tasks in parallel over multiple threads, where the tasks are stored in a task execution queue 440. The queue stores multiple tasks in order, for example, based on the task priority. The task that is at the top of the queue can be the task that has the highest priority and is the task that would be the next in line for execution at a thread in the pool 405.

The database system environment 400 may be substantially similar to the environment where statements are requested for execution as described in relation to FIGS. 1, 2A and 2B, and 3.

In some instances, request for execution of statement, as discussed in FIG. 2B, can be performed by two users at different points in time, where a different hierarchy structure may be applicable because for example a modification to the structure can be made. For example, a modification to the structure may be a modification to the limits defined for each workload class in a hierarchy. In the example of FIG. 2A, a modification can be a modification of the limit for workload class 210 from fifteen to ten. In those cases, if a user has requested an execution of a statement before a modification, the limits would be considered to be the limits as defined in the initial state, while a statement requested after the modification would have applicable limits as defined in the modified state.

For example, a set of limits for a workload class hierarchy can be defined by an administrator and the limits can be stored in a limiter data structure 405. For example, the limiters can be two—A and B—for a workload that includes a statement. When a first user 401 requests execution of a statement, the limiters associated with the current hierarchy of the workload classes are obtained at 425, and at 427, a snapshot of the current state is created and maintained for the user 401. Based on the requested execution of a statement, a set of jobs are created, where the jobs are defined to point to the current snapshot at 430. During the execution of the jobs, counters associated with the nodes from the hierarchy are increased at 435, and jobs that are not yet to be processed because they would violate the limits can be put into a queue at 440.

At 445, a modification to a limiter is made, for example, limiter B is replaced by C and this change is stored at the limiters 405 storage. In that case, the previous requests, such as the initial request of the first user 401 would continue to be executed with the limitations from the initially obtained limiters at 425 and the snapshot as created at 427, while newly created jobs for subsequently requested statement would be executed in accordance with the new modified limiters from 445.

If a second user 402 requests to execute a new statement at 450, after the modification at 445 to the limiters, the relevant limiters would be obtained from the limiter 405 storage. A snapshot relevant for the second user is created at 455, and jobs are created and executed at 460 in accordance with the limits as defined at the snapshot (created at 455). Counters can be increased at 465 for the execution of jobs, where the counters would be considered for the modified hierarchy with a replaced limiter as performed at 445. When jobs performed for the second user 402 are finished, the counters modified during the jobs executed (of the jobs added at 460) would be reduced, where those counters would be consistent with the limiters associated with the referred snapshot that is created at 455. On the other hand, when jobs performed by the first user 401 are finished, the counters that were modified during the execution of these jobs (of the jobs created at 430) would be reduced as consistent with the limiters as determined according to the snapshot that was relevant for those jobs, which was the snapshot referred by these jobs and created at 427 prior to the modification at 445.

Figure 5:
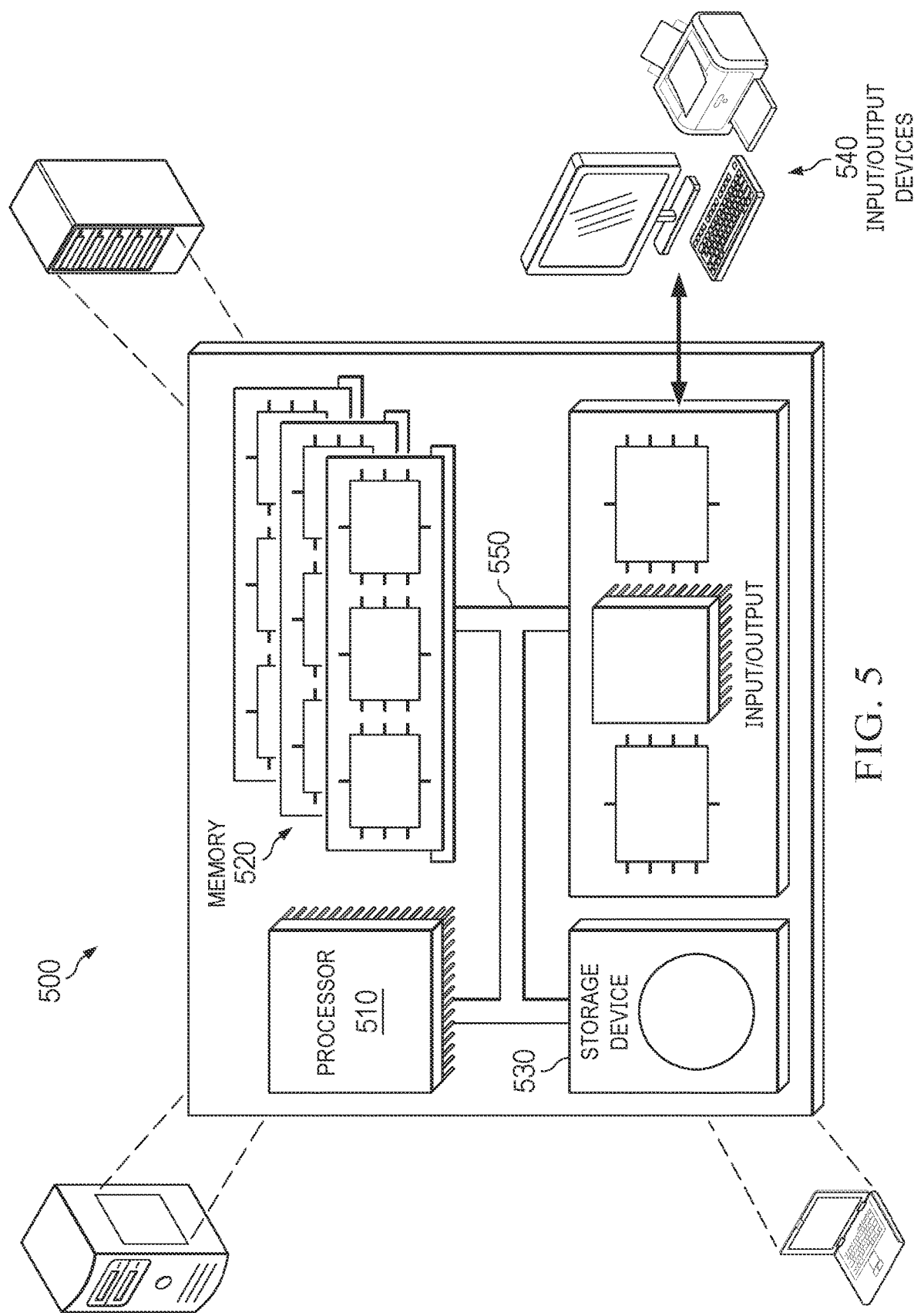
FIG. 5 is a schematic diagram of an example computer system that can be used to execute implementations of the present disclosure.

FIG. 5 is a schematic diagram of an example computer system 500 that can be used to execute implementations of the present disclosure. For example, the computer system 500 may be included in any or all of the server components discussed herein. The computer system 500 includes a processor 510, a memory 520, a storage device 530, and an input/output device 540. The components 510, 520, 530, and 540 are interconnected using a system bus 550. The processor 510 is capable of processing instructions for execution within the computer system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computer system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device.

The input/output device 540 provides input/output operations for the computer system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or combinations of these. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as SPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of these. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the one described. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Example 1. A computer-implemented method for flexibly managing limits for execution of jobs in parallel threads provided by a system, the method comprising:
  in response to receiving a request for the execution of a first statement at one or more threads associated with parallel processing at the system, obtaining a first snapshot object of an initial hierarchy of workload classes organizing sets of statements, wherein the first snapshot object includes pointers to limiters defined for the workload classes and the statements within the initial hierarchy, wherein each limiter defines an allowable number of threads for parallel execution of jobs created for a statement or a workload class, and wherein each of the limiters is applied to a respective workload class and one or more child workload classes or statements in aggregation;
  performing a modification to the hierarchy of workload classes during runtime of the one or more jobs;
  obtaining a second snapshot object of a modified hierarchy of the workload classes; and
  completing the execution of one or more created jobs for the execution of the first statement based on complying with limits as aggregately calculated for the first statement according to application of the limiters defined for the initial hierarchy of workload classes.

Example 2. The method of Example 1, further comprising:
  deleting the first snapshot object in response to completing the execution of the one or more created jobs for the first statement at the system.

Example 3. The method of Example 1 or 2, wherein each workload class is defined as either including another workload class or a set of statements.

Example 4. The method of any one of the preceding Examples, wherein each workload class is associated with a respective limit defining the allowable number of threads for parallel execution of jobs created for one or more statements that are hierarchically associated with the respective workload class.

Example 5. The method of any one of the preceding Examples, wherein the one or more jobs are created for the execution of the first statement and are stored in a queue associated with the first statement, wherein each of the one or more jobs includes a pointer to the first snapshot object.

Example 6. The method of any one of the preceding Examples, wherein completing the execution of the one or more created jobs for the execution of the first statement comprises:
   providing a job from the one or more jobs to a thread of the threads when determining that an allowable number of threads for parallel processing associated with the first statement is higher as compared to a number of currently processed jobs associated with the first statement.

Example 7. The method of any one of the preceding Examples, further comprising:
   in response to receiving a request for an execution of a second statement as part of a first workload class of the modified hierarchy, creating one or more jobs for the second statement to be executed at one or more threads from the threads; and
   executing the one or more jobs for the second statement based on the limits as aggregately calculated according to the modified hierarchy, wherein the limiters defined for the workload classes and the statements in the modified hierarchy are aggregately applied to propagate the limitations of a parent workload class to a child workload class or a statement.

Example 8. The method of any one of the preceding Examples, wherein the modification of the hierarchy includes a change in a relationship between a first workload class, a second workload class, and a third workload class, wherein before the modification the first workload class is a parent node in the hierarchy for the second workload class and the third workload class, and after the modification, the second workload class is defined as a child node to the third workload class.

Example 9. The method of any one of the preceding Examples, wherein each workload class defines a set of statements, wherein a first statement is associated with two workload classes and is executed as separate instance executions associated with different versions of the hierarchy of the workload classes organizing sets of statements.

Example 10. The method of any one of the preceding Examples, wherein finishing the execution of the one or more created jobs comprises:
   establishing a queue of jobs to be executed at the threads, wherein the jobs from the queue are consecutively provided for parallel or sequential execution at one or more threads of the threads until the one or more created jobs are finished for execution.

Example 11. A system comprising:
   one or more processors; and
   one or more computer-readable memories coupled to the one or more processors and having instructions stored thereon that are executable by the one or more processors to perform the method of any of Examples 1 to 10.

Example 12: A non-transitory, computer-readable medium coupled to one or more processors and having instructions stored thereon which, when executed by the one or more processors, cause the one or more processors to perform the method of any of Examples 1 to 10.

The invention claimed is:

1. A computer-implemented method for flexibly managing limits for execution of jobs in parallel threads provided by a system, the method comprising:
   in response to receiving a request for the execution of a first statement at one or more threads associated with parallel processing at the system, obtaining a first snapshot object of an initial hierarchy of workload classes organizing sets of statements, wherein the first snapshot object includes pointers to limiters defined for the workload classes and the statements within the initial hierarchy, wherein each limiter defines an allowable number of threads for parallel execution of jobs created for a statement or a workload class, and wherein each of the limiters is applied to a respective workload class and one or more child workload classes or statements in aggregation;
   performing a modification to the hierarchy of workload classes during runtime of the one or more jobs;
   obtaining a second snapshot object of a modified hierarchy of the workload classes; and
   completing the execution of one or more created jobs for the execution of the first statement based on complying with limits as aggregately calculated for the first statement according to application of the limiters defined for the initial hierarchy of workload classes.

2. The method of claim 1, further comprising:
   deleting the first snapshot object in response to completing the execution of the one or more created jobs for the first statement at the system.

3. The method of claim 1, wherein each workload class is defined as either including another workload class or a set of statements.

4. The method of claim 1, wherein each workload class is associated with a respective limit defining the allowable number of threads for parallel execution of jobs created for one or more statements that are hierarchically associated with the respective workload class.

5. The method of claim 1, wherein the one or more jobs are created for the execution of the first statement and are stored in a queue associated with the first statement, wherein each of the one or more jobs includes a pointer to the first snapshot object.

6. The method of claim 1, wherein completing the execution of the one or more created jobs for the execution of the first statement comprises:
   providing a job from the one or more jobs to a thread of the threads when determining that an allowable number of threads for parallel processing associated with the first statement is higher as compared to a number of currently processed jobs associated with the first statement.

7. The method of claim 1, further comprising:
   in response to receiving a request for an execution of a second statement as part of a first workload class of the modified hierarchy, creating one or more jobs for the second statement to be executed at one or more threads from the threads; and
   executing the one or more jobs for the second statement based on the limits as aggregately calculated according to the modified hierarchy, wherein the limiters defined for the workload classes and the statements in the modified hierarchy are aggregately applied to propagate the limitations of a parent workload class to a child workload class or a statement.

8. The method of claim 1, wherein the modification of the hierarchy includes a change in a relationship between a first workload class, a second workload class, and a third workload class, wherein before the modification the first workload class is a parent node in the hierarchy for the second workload class and the third workload class, and after the modification, the second workload class is defined as a child node to the third workload class.

9. The method of claim 1, wherein each workload class defines a set of statements, wherein a first statement is associated with two workload classes and is executed as separate instance executions associated with different versions of the hierarchy of the workload classes organizing sets of statements.

10. The method of claim 1, wherein finishing the execution of the one or more created jobs comprises:
establishing a queue of jobs to be executed at the threads, wherein the jobs from the queue are consecutively provided for parallel or sequential execution at one or more threads of the threads until the one or more created jobs are finished for execution.

11. A system comprising:
one or more processors; and
one or more computer-readable memories coupled to the one or more processors and having instructions stored thereon that are executable by the one or more processors to perform operations comprising:
in response to receiving a request for the execution of a first statement at one or more threads associated with parallel processing at the system, obtaining a first snapshot object of an initial hierarchy of workload classes organizing sets of statements, wherein the first snapshot object includes pointers to limiters defined for the workload classes and the statements within the initial hierarchy, wherein each limiter defines an allowable number of threads for parallel execution of jobs created for a statement or a workload class, and wherein each of the limiters is applied to a respective workload class and one or more child workload classes or statements in aggregation;
performing a modification to the hierarchy of workload classes during runtime of the one or more jobs;
obtaining a second snapshot object of a modified hierarchy of the workload classes; and
completing the execution of one or more created jobs for the execution of the first statement based on complying with limits as aggregately calculated for the first statement according to application of the limiters defined for the initial hierarchy of workload classes.

12. The system of claim 11, wherein the one or more computer-readable memories have instructions stored thereon which when executed by the one or more processors perform operations comprising:
deleting the first snapshot object in response to completing the execution of the one or more created jobs for the first statement at the system.

13. The system of claim 11, wherein each workload class is defined as either including another workload class or a set of statements.

14. The system of claim 11, wherein each workload class is associated with a respective limit defining the allowable number of threads for parallel execution of jobs created for one or more statements that are hierarchically associated with the respective workload class.

15. The system of claim 11, wherein the one or more jobs are created for the execution of the first statement and are stored in a queue associated with the first statement, wherein each of the one or more jobs includes a pointer to the first snapshot object.

16. The system of claim 11, wherein completing the execution of the one or more created jobs for the execution of the first statement comprises:
providing a job from the one or more jobs to a thread of the threads when determining that an allowable number of threads for parallel processing associated with the first statement is higher as compared to a number of currently processed jobs associated with the first statement.

17. A non-transitory, computer-readable medium coupled to one or more processors and having instructions stored thereon which, when executed by the one or more processors, cause the one or more processors to perform operations comprising:
in response to receiving a request for the execution of a first statement at one or more threads associated with parallel processing at a system, obtaining a first snapshot object of an initial hierarchy of workload classes organizing sets of statements, wherein the first snapshot object includes pointers to limiters defined for the workload classes and the statements within the initial hierarchy, wherein each limiter defines an allowable number of threads for parallel execution of jobs created for a statement or a workload class, and wherein each of the limiters is applied to a respective workload class and one or more child workload classes or statements in aggregation;
performing a modification to the hierarchy of workload classes during runtime of the one or more jobs;
obtaining a second snapshot object of a modified hierarchy of the workload classes; and
completing the execution of one or more created jobs for the execution of the first statement based on complying with limits as aggregately calculated for the first statement according to application of the limiters defined for the initial hierarchy of workload classes.

18. The computer-readable medium of claim 17, wherein each workload class is defined as either including another workload class or a set of statements.

19. The computer-readable medium of claim 17, wherein each workload class is associated with a respective limit defining the allowable number of threads for parallel execution of jobs created for one or more statements that are hierarchically associated with the respective workload class.

20. The computer-readable medium of claim 17, wherein the one or more jobs are created for the execution of the first statement and are stored in a queue associated with the first statement, wherein each of the one or more jobs includes a pointer to the first snapshot object.

* * * * *